(12) United States Patent
Eder et al.

(10) Patent No.: US 6,184,466 B1
(45) Date of Patent: Feb. 6, 2001

(54) WALLPLATE RETENTION DEVICE

(75) Inventors: John Eder, Floral Park; James J. Sherman, Jericho, both of NY (US)

(73) Assignee: Leviton Manufacturing Co., Inc., Little Neck, NY (US)

(*) Notice: Under 35 U.S.C. 154(b), the term of this patent shall be extended for 0 days.

(21) Appl. No.: 09/388,642

(22) Filed: Sep. 2, 1999

(51) Int. Cl.$^7$ .................................................. H01H 9/02
(52) U.S. Cl. ............................... 174/53; 174/54; 174/55; 439/538
(58) Field of Search ........................ 174/53, 54, 55, 174/66, 138 F, 35 C, 135; 220/241, 3.8; 439/538, 539; D13/173

(56) References Cited

U.S. PATENT DOCUMENTS

| | | | |
|---|---|---|---|
| 1,875,224 | * 8/1932 | DesPard | 174/53 |
| 3,900,238 | * 8/1975 | Anderson | 439/438 |
| 4,422,701 | * 12/1983 | Anderson | 439/107 |
| 5,936,199 | * 8/1999 | Lutz | 174/53 |
| 6,102,713 | * 8/2000 | Todd, Jr. | 439/107 |

* cited by examiner

*Primary Examiner*—Kristine Kincaid
*Assistant Examiner*—Dhiro R Patel
(74) *Attorney, Agent, or Firm*—Paul J. Sutton

(57) ABSTRACT

The threaded wallplate mounting lobes of a mounting strap are eliminated and replaced by a retainer made of thin, hard brass sheet metal. The retainer has a body portion fixed to the mounting strap at each of its two ends and an apertured lobe which takes the place of the lobes of the mounting strap. By contouring the shape of the apertures in the retainers, mounting fasteners may be forced through such apertures to assemble a wallplate to a mounting strap without the usual mating of fastener and threaded mounting lobes.

6 Claims, 5 Drawing Sheets

WALLPLATE RETENTION DEVICE

BACKGROUND OF THE INVENTION

1. Field of the Invention

The invention is drawn to the field of electrical wiring devices and more particularly to a device which can be added to an electrical switch or receptacle to permit the quick assembly of a wallplate over such switch or receptacle or other wiring devices.

2. Description of the Prior Art

At the present time the mounting straps of known switches and receptacles have threaded apertures adjacent to their outwardly projecting apertured plaster ears on both ends of such strap. Once the wiring device is installed, the wallplate is attached to the wiring device itself. The shortness of the threaded fasteners used to mount the wallplates to the wiring devices makes them difficult to handle and easily lost. The use of plastic screws prevents the installation of these screws with magnetic screwdrivers.

SUMMARY OF THE INVENTION

The invention modifies the wiring devices mounting straps by replacing a threaded wallplate mounting aperture with a thin, hard retainer which has an aperture through it. The retainer, about the aperture, is so configured that a wallplate threaded fastening screw can be forced into such retainer aperture without requiring rotation and advancement of the screw and which can only be withdrawn by rotating the screw with a screwdriver. It is an object of the instant invention to provide a novel wallplate mounting device.

It is another object of the instant invention to provide a novel wallplate mounting device which employs a wallplate mounting ear added to each end of a mounting strap.

It is another object of the instant invention to provide a novel wallplate mounting device which employs a wallplate mounting ear added at each end of a mounting strap, the wallplate mounting ear having an aperture which permits a wallplate mounting screw to be advanced through the aperture by pushing the wallplate mounting screw into the aperture.

Other objects and features of the invention will be pointed out in the following description and claims and illustrated in the accompanying drawings, which disclose, by way of example, the principles of the invention, and the best mode which is presently contemplated for carrying them out.

BRIEF DESCRIPTION OF THE DRAWING

In the drawing in which similar elements are given similar reference characters.

DESCRIPTION OF THE PREFERRED EMBODIMENTS

Figure 1:
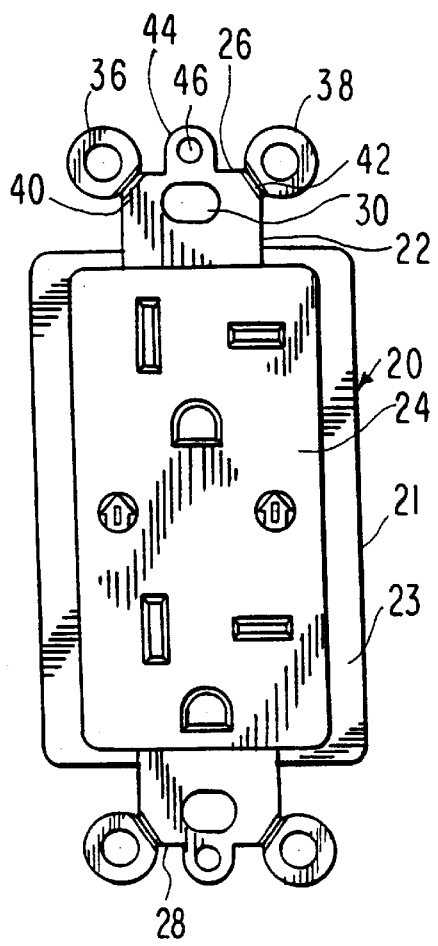
FIG. 1 is a top plan view of a receptacle according to the prior art.
Figure 2:
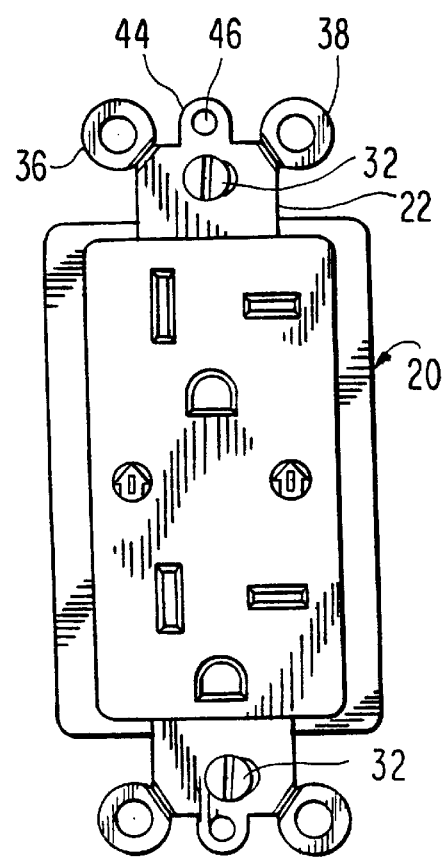
FIG. 2 is the same as FIG. 1 with the wiring device mounting screws in place according to the prior art.
Figure 3:
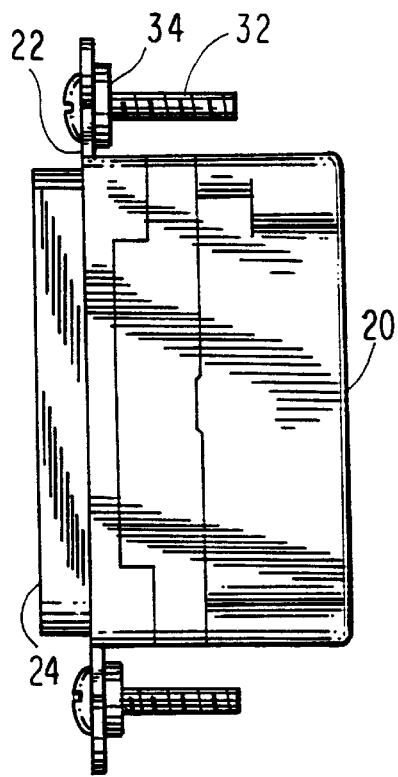
FIG. 3 is a side elevational view of the wiring device of FIG. 2 in accordance with the prior art.
Figure 4:
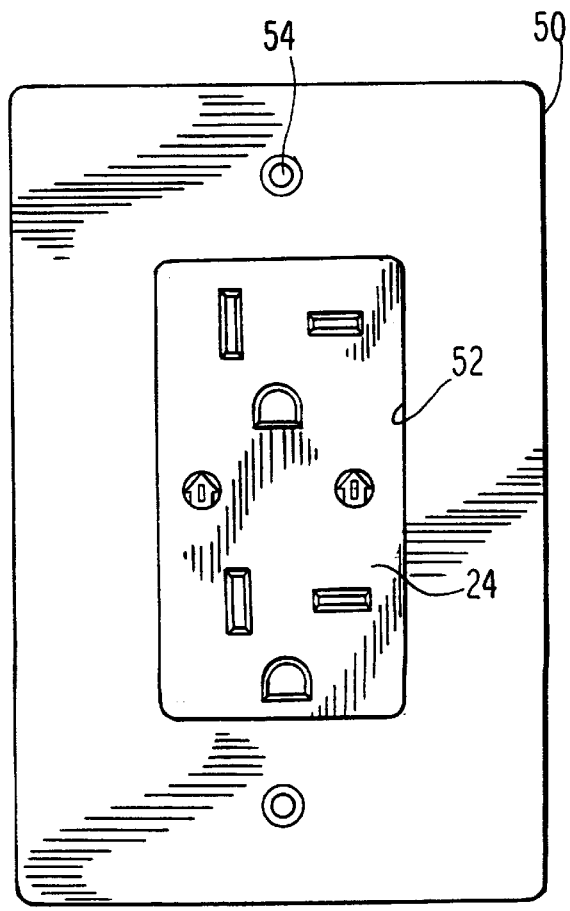
FIG. 4 is the same as FIG. 1 but with a wallplate positioned over the wiring device according to the prior art.

Turning first to FIGS. 1 to 5 there is shown a wiring device 20 having a mounting strap 22, partially hidden behind a device face 24. It should be understood that although a receptacle type wiring device 20 is shown, the invention is equally applicable to switches or combination switches and receptacles, lights and the like which can be accepted in an open, single gem wiring box or mounted to a wall or other supporting surface. It should also be understood that the particular receptacle configuration shown, that is NEMA 6-20R, is for illustrative purposes only and is not limited to such configuration. Mounting strap 22 has a first end 26 and a second end 28 both of which are the same but rotated 180° with respect to one another. For ease of description only the first end 26 of mounting strap 22 will be described. Adjacent to the first end 26 of mounting strap 22 is a mounting slot 30 to receive a threaded fastener 32 (see FIG. 2) which mounts the wiring device or receptacle 20 to the ear of a gem box (not shown) or a surface mounted box (not shown). The threaded fastener 32 is retained within the mounting slot 30 prior to installation by means of a small square 34 of fiber, plastic or other insulating material (see FIG. 3). Projecting outwardly from adjacent end 26 of mounting strap 22 are two, apertured plaster ears 36, 38 which rest on the plaster or wallboard adjacent to a gem box mounted in a wall to hold the receptacle face close to the surface of such wall. If not required, ears 36 and 38 can be broken off along the score lines 40, 42, respectively.

Figure 5:
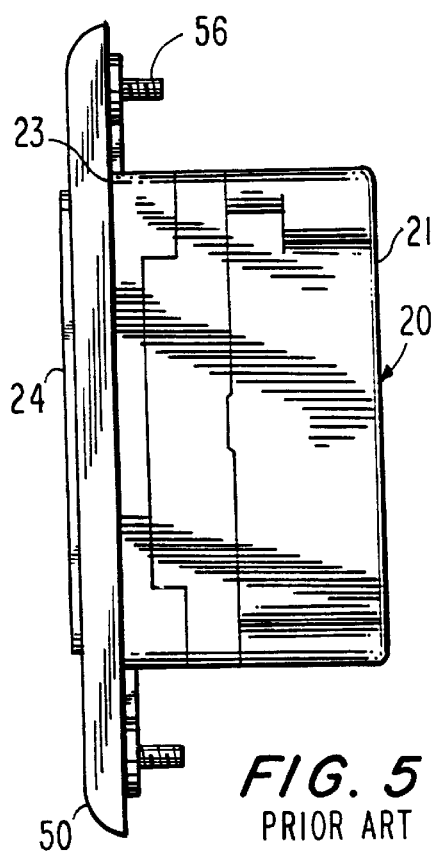
FIG. 5 is a side elevational view of the wiring device of FIG. 4 according to the prior art.

Between the plaster ears 36, 38 is located to a central lobe 44, which extends from first end 26 of mounting strap 22. The central lobe 44 has a threaded aperture 46 to receive a threaded fastener 56. Once the receptacle 20 has been installed, the exposed receptacle 20 is covered with a wallplate 50 which may be decorative and which prevents access to the wiring in the gem box. Wallplate 50 (see FIGS. 4 and 5) has a width and length greater than the width and length of the receptacle 20 so that when wallplate 50 is in place only selected portions of the receptacle 20 are visible. The wallplate 50 is also higher than the receptacle 20 to accommodate the mounting strap 22 and any fastening screws 32 below it. An aperture 52 permits the faceplate 24 of receptacle 20 to project therethrough to permit access to the plug openings of the receptacle 20. The wiring portion 21 of receptacle 20 can be made wider and longer than faceplate 24 to provide a shoulder 23 on which rests the wallplate 50, as shown in FIG. 5. Two mounting apertures 54 are provided in wallplate 50 to receive threaded fasteners 56. To mount the wallplate 50 on the receptacle 20, the mounting apertures 54 on the wallplate 50 are aligned with the threaded apertures 46 in central lobes 44 and a fastener 56 is passed through each aperture 54 and made to engage the threads of a threaded aperture 46. To prevent possible contact with the wall board surface, these threaded fasteners are kept quite short making them difficult to handle and if dropped difficult to locate. Also, the use of colored plastic screws to match the wallplate 50 color cannot be used with magnetic screwdrivers making installation difficult.

The instant invention overcomes the difficulties noted above with respect to prior art approaches to fastening a wallplate over and to a wiring device by providing retainers having apertures therethrough and configured so that a wallplate mounting screw can be placed in an aperture of a mounting strap by pushing only and not requiring rotation of the wallplate mounting screw. The walls defining the aperture of the mounting strap acts as a one-way clutch permitting the screw to be inserted by pushing and removed only by rotation and withdrawal.

Figure 6:
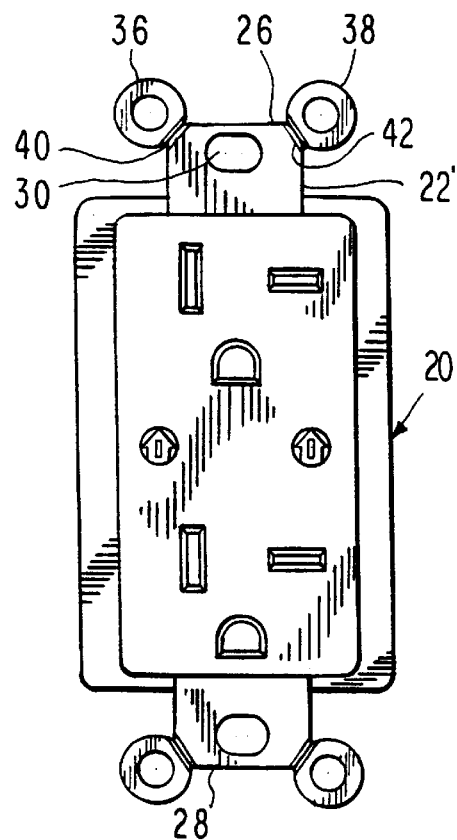
FIG. 6 is a top plan view of the wiring device of FIG. 1 with the mounting strap modified in accordance with the concepts of the invention.
Figure 7:
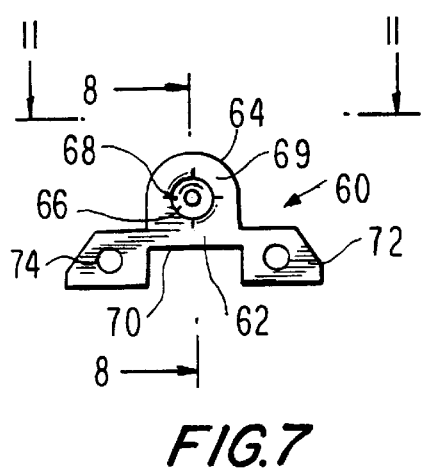
FIG. 7 is a top plan view of the retainer employed with the modified mounting strap in the wallplate retention device according to the concept of the invention.
Figure 8:
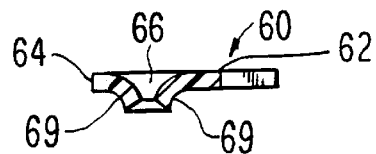
FIG. 8 is a side elevational view, in section, taken along the lines 8—8 in FIG. 7.
Figure 9:
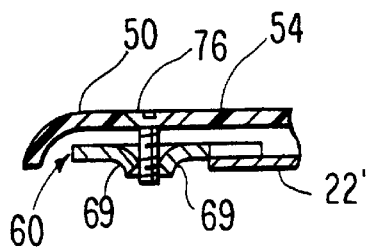
FIG. 9 is the same as FIG. 8 except as fragmentary portion of a wallplate is shown installed to the retainer of the FIG. 8 with a mounting screw.
Figure 11:
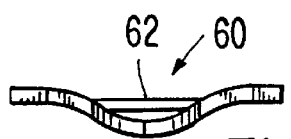
FIG. 11 is a front elevational view of a retainer taken along the lines 11—11 in FIG. 7.

Wiring device or receptacle 20 has a mounting strap 22' similar to mounting strap 22 with the exception that mounting strap 22' does not have a central lobe 44 with a threaded aperture 46 at each of the mounting strap ends 26, 28 as shown in FIG. 6. Left in this condition a wallplate 50 could not be mounted on and to receptacle 20. Turning now to FIGS. 7 to 13, there is shown a retainer 60 having a body portion 62 and a lobe 64 which contains aperture 66. The walls of lobe 64 that define the aperture 66 are partially severed as at 68 to provide a number of fingers 69 which can engage the threads of a threaded fastener, as will be set forth below. Body portion 62 has a slot 70 in the shape of slot 30 so that threaded fastener 32 can pass through aligned slots 70 and 30. To either side of slot 70 is a tab 72 containing an aperture 74 used to secure the retainer 60 adjacent first end 26 of mounting strap 22'. The material of the mounting strap 22' may be punched through apertures 74 and upset to hold retainer 60 and the mounting strap 22's in assembly. The lobe 64 is positioned so that it occupies the same position as central lobe 44 and the aperture 66 occupies the same position as aperture 46 of the mounting strap 22. The fingers 69 can be bent outwardly as shown in FIGS. 8 and 9. The free ends of fingers 69 can be bent the same amount to define a circle or bent different amounts to provide an approximation of a one turn helix.

As shown in FIG. 9, when a wall plate 50 is laid over mounting strap 22'and retainer 60, it covers both and can be moved to align apertures 54 and 66. A threaded fastener 76 is now placed in aperture 54 and is installed to mounting strap 22's by pushing the threaded fastener 76 into aperture 74 rather than by turning the threaded fastener into aperture 74. The retainer 60 is fabricated from thin, hard brass sheet metal which allows the fingers 69 to flex outwardly as the threaded fastener 76 is forced into aperture 66 but tend to return to their initial position as the threaded fastener 76 is fully seated.

Figure 12:
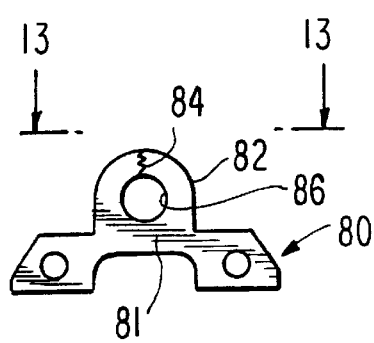
FIG. 12 is a top plan view of an alternative form of retainer according to the concepts of the invention.
Figure 13:
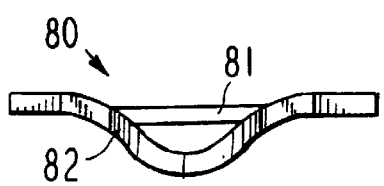
FIG. 13 is a front elevational view of the retainer of FIG. 12 taken along the lines 13—13 in FIG. 12.

FIGS. 12 and 13 show a retainer 80 which does not partially sever the lobe 64 about the aperture 66, instead the lobe 82 is displaced as at 84 about its longitudinal axis with respect to body portion 81. A threaded fastener 76 is also installed by being pushed through aperture 86. The threaded fastener 76 can be removed from retainers 60 and 80 by turning the fasteners 76 in a retrograde direction to permit the fasteners 76 to be withdrawn.

Figure 10:
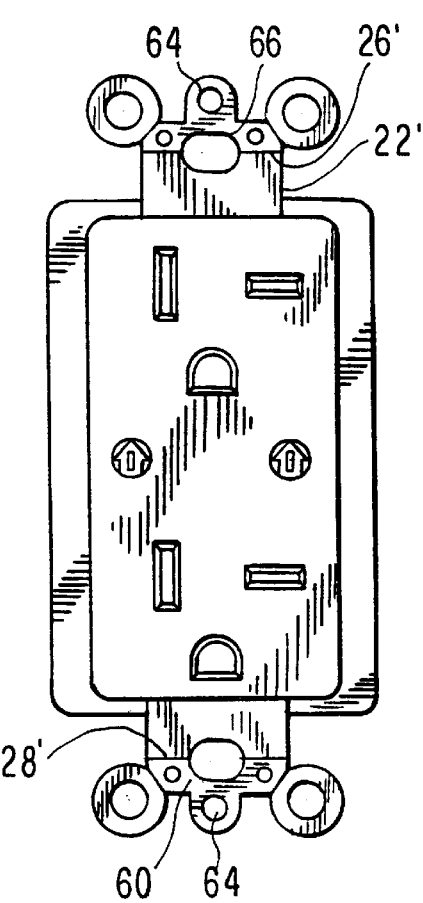
FIG. 10 is a top plan view of the modified mounting strap of FIG. 6 with the retainers of FIG. 7 applied to both ends of the modified mounting strap.

FIG. 10 shows retainers 60 installed to first end 26's and second end 28' of the modified mounting strap 22'. To attach a wall plate 50 to the mounting strap 22', threaded fasteners (not shown) must be forced into the aperture 64 as above described.

Figure 14:
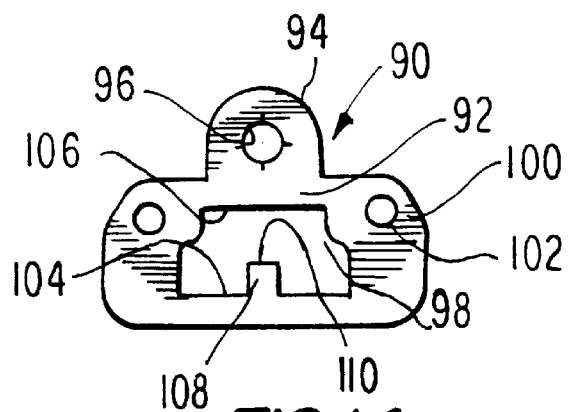
FIG. 14 is a top plan view of still another alternative form of retainer according to the concepts of the invention.
Figure 15:
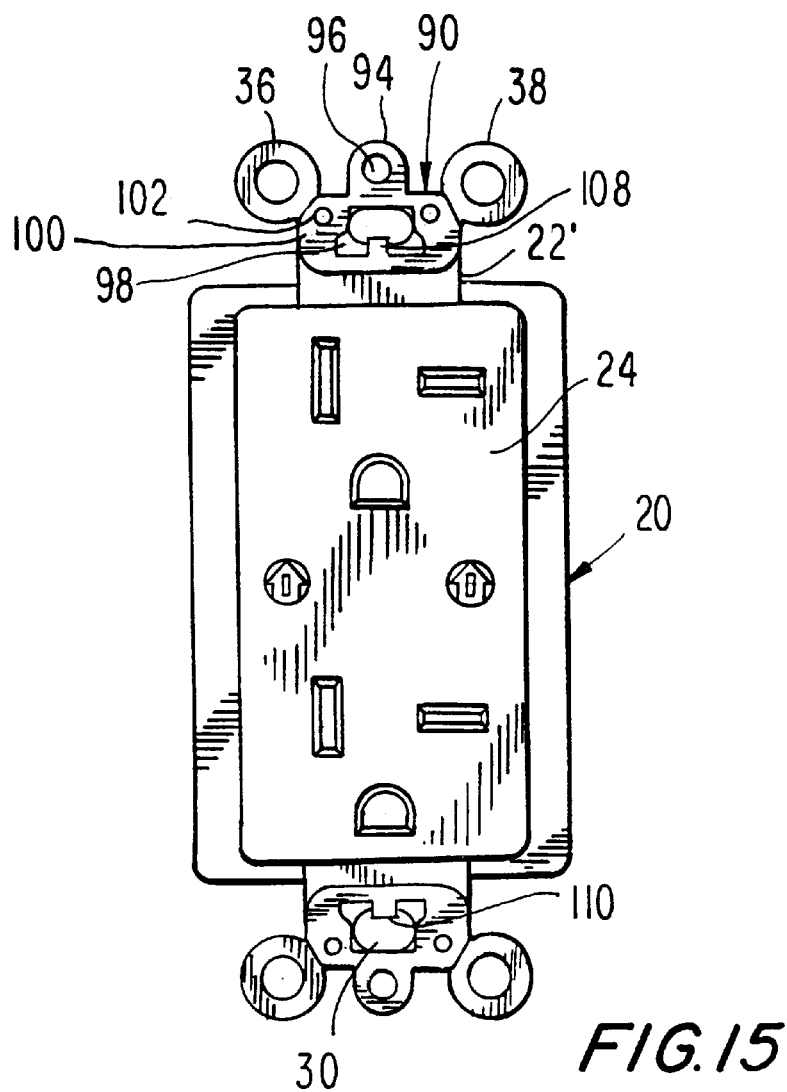
FIG. 15 is a top plan view of the wiring device of FIG. 1 with two alternative forms of retainer shown in FIG. 14 applied to each end of the mounting strap.

A modified retainer 90 is shown in FIGS. 14 and 15. Retainer 90 is substantially the same as retainer 60, having a body portion 92, a lobe 94, an aperture 96 in lobe 94, two tabs 100 each containing an aperture 102 to mount the retainer 90 on and to the mounting strap 22' as was described above with respect to retainer 60. Retainer 90 has a fully enclosed slot 98 which includes a back wall 104 and a front wall 106. The slot 98 matches the mounting slot 30 of the mounting strap 22' to permit a threaded fastener 32 (not shown) to pass through both slots 98 and 30. Extending from back wall 104 is a tongue 108 having a free end 110 which is closer to front wall 106 than the base of tongue 108. The spacing between the free end 110 of tongue 108 and the front wall 106 of retainer body portion 92 is less than the diameter of a threaded fastener 32 and with the introduction of a threaded fastener 32, the tongue 108 is deflected away from the plane of retainer 90. However, the resilience of the tongue 108 allows the free end 110 to move towards front wall 106 and engage a root between adjacent threads and thus retain threaded fastener 32 in slot 98. This eliminates the need for the insulating square 34 as is found in the prior art.

While there have been shown and described and pointed out the fundamental novel features of the invention as applied to the preferred embodiments, as are presently contemplated for carrying them out, it will be understood that various omissions and substitutions and changes of the form and details of the devices illustrated and in their operation may be made by those skilled in the art, without departing from the spirit of the invention.

We claim:

1. A wallplate retention device for retaining a wallplate over a wiring device, comprising:
  a) a mounting strap having a first end and a second end, said mounting strap having a mounting slot and two outwardly projecting apertured plaster ears at each of said first and second ends;
  b) two retainers, each having a body portion adapted to be coupled adjacent to one of said first and second ends of said mounting strap;
  c) said retainers, each having a central lobe projecting from said body portion and positioned between associated ones of said two outwardly projecting apertured plaster ears;
  d) each said central lobe having an aperture therein; and
  e) said aperture in said central lobe formed to allow a threaded fastener to be pushed therethrough without turning of the threaded fastener but withdrawn only with the turning of the threaded fastener.

2. The wallplate retention device, as defined in claim 1, wherein said aperture in said central lobe is depressed below the remainder of said central lobe.

3. The wallplate retention device, as defined in claim 1, wherein said aperture in said central lobe is partially slit to form tongues having free ends to engage threads of the threaded fastener.

4. The wallplate retention device, as defined in claim 3, wherein said aperture in said central lobe is depressed below the remainder of said central lobe and the free ends of said tongues form a one turn thread.

5. The wallplate retention device, as defined in claim 1, wherein said retainers are each fabricated of a thin, hard brass sheet metal.

6. The wallplate retention device, as defined in claim 1, wherein said retainer body portions are staked adjacent to said mounting strap.

* * * * *